United States Patent
Jakobeit et al.

(10) Patent No.: US 10,287,461 B2
(45) Date of Patent: May 14, 2019

(54) ADHESIVE STRIP HAVING A TEMPORARY FIXING ADHESIVE

(71) Applicant: TESA SE, Norderstedt (DE)

(72) Inventors: Oliver Jakobeit, Hamburg (DE); Patrick Kerep, Hamburg (DE); Christian Schuh, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/571,589

(22) PCT Filed: May 3, 2016

(86) PCT No.: PCT/EP2016/059807
§ 371 (c)(1),
(2) Date: Nov. 3, 2017

(87) PCT Pub. No.: WO2016/177685
PCT Pub. Date: Nov. 10, 2016

(65) Prior Publication Data
US 2018/0155580 A1    Jun. 7, 2018

(30) Foreign Application Priority Data
May 5, 2015    (DE) .................. 10 2015 208 320

(51) Int. Cl.
| C09J 7/38 | (2018.01) |
| C09J 163/00 | (2006.01) |
| B29C 70/54 | (2006.01) |
| C08L 9/02 | (2006.01) |
| C08L 75/04 | (2006.01) |

(Continued)

(52) U.S. Cl.
CPC ............ *C09J 7/383* (2018.01); *B29C 70/543* (2013.01); *C08L 9/02* (2013.01); *C08L 75/04* (2013.01); *C09J 5/00* (2013.01); *C09J 7/10* (2018.01); *C09J 7/38* (2018.01); *C09J 163/00* (2013.01);

(Continued)

(58) Field of Classification Search
CPC ........................................................ C09J 7/383
See application file for complete search history.

(56) References Cited

U.S. PATENT DOCUMENTS

| 3,018,262 A | 1/1962 | Schroeder |
| 3,117,099 A | 1/1964 | Proops et al. |

(Continued)

FOREIGN PATENT DOCUMENTS

| EP | 2 229 421 B1 | 7/2011 |
| JP | H-05295134 A | 11/1993 |

(Continued)

OTHER PUBLICATIONS

"Handbook of Pressure Sensitive Adhesive Technology" by Donatas Satas (Satas & Associates, Warwick 1999).

(Continued)

*Primary Examiner* — Daniel H Lee
(74) *Attorney, Agent, or Firm* — Norris McLaughlin, P.A.

(57) ABSTRACT

Adhesive strip containing a temporary fixing adhesive for a first temporary fixing of two substrates to one another as a preliminary stage to a second final fixing of the two substrates, wherein the second final fixing takes place by means of a final fixing adhesive and said final adhesive assimilates the temporary fixing adhesive during the second final fixing, wherein the temporary fixing adhesive is a non-crosslinked bonding adhesive and dissolves in the final fixing adhesive during the second final fixing.

11 Claims, 1 Drawing Sheet

(51) Int. Cl.
 *C09J 7/10* (2018.01)
 *C09J 5/00* (2006.01)
(52) U.S. Cl.
 CPC ........ *C09J 2409/00* (2013.01); *C09J 2463/00* (2013.01); *C09J 2475/00* (2013.01)

(56) References Cited

U.S. PATENT DOCUMENTS

| | | |
|---|---|---|
| 8,609,557 B2 | 12/2013 | Palinsky et al. |
| 2010/0273378 A1 | 10/2010 | Palinsky et al. |

FOREIGN PATENT DOCUMENTS

| | | |
|---|---|---|
| WO | 1997/03828 A1 | 2/1997 |
| WO | 2002/068555 A1 | 9/2006 |
| WO | 2007/093318 A1 | 8/2007 |
| WO | 2009/087192 A1 | 7/2009 |
| WO | 2012/026980 A1 | 3/2012 |
| WO | 2013/060588 A1 | 5/2013 |
| WO | 2013/107829 A1 | 7/2013 |

OTHER PUBLICATIONS

Kleben—Grundlagen, Technologien, Anwendungen, 6. Auflage, Springer, 2009.
International Search Report dated Jul. 26, 2017.
English Translation of International Search Report dated Jul. 26, 2017.
English translation of Japanese Office Action dated Oct. 11, 2018 in Japanese Patent Application No. 2017-557343.

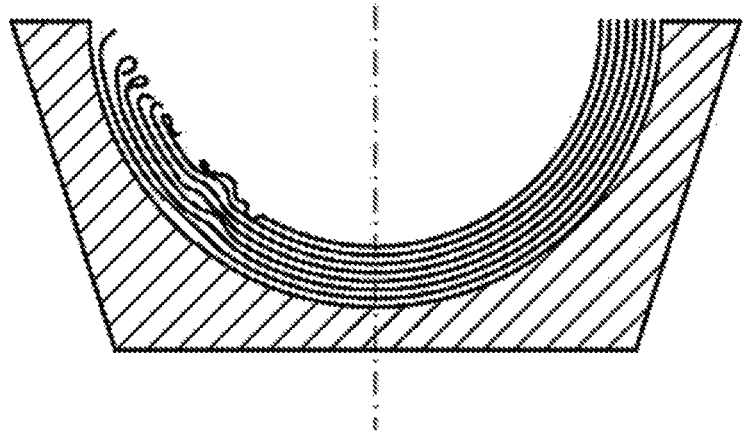

ADHESIVE STRIP HAVING A TEMPORARY FIXING ADHESIVE

This is a 371 of PCT/EP2016/059807 filed 3 May 2016, which claims foreign priority benefit under 35 U.S.C. 119 of German Patent Application 10 2015 208 320.9 filed May 5, 2015, the entire contents of which are incorporated herein by reference.

BACKGROUND OF THE INVENTION

The present invention relates to an adhesive strip containing a temporary fixing adhesive for a first temporary fixing of two substrates to one another as a first stage to a second final fixing of the two substrates, wherein the second final fixing is effected by means of a final fixing adhesive, in particular an epoxy resin, and this final fixing adhesive absorbs the temporary fixing adhesive in the course of the second final fixing, to a use of this adhesive strip and to a method for producing a composite.

BRIEF DESCRIPTION OF THE DRAWING

FIG. 1 illustrates the process of vacuum assisted resin transfer molding.

Fiber-reinforced epoxy resins have numerous areas of application. For instance, they are used in the automobile industry, in boatbuilding, in aircraft construction or in the production of rotor blades for wind turbines. In the production of rotor blades for wind turbines, many layers of glass-fiber mats are laid out over a large area in the required shape. In a so-called vacuum infusion process, epoxy resins are then drawn in (process names: vacuum-assisted resin transfer molding (VARTM, vacuum infusion). This is shown in FIG. 1. In order to prevent the glass-fiber mats being displaced or forming folds in this process, which constitutes a greater problem the larger the glass-fiber mats are, it is desirable to hold the glass-fiber mats temporarily in the required position. Hence, they are either adhered at the edges or spray adhesives are used. Edge adhesion is inconvenient and susceptible to error when fixing the mats. Since the mats are fixed only at their edges, there may be faults in the mats in regions of the mold lying further inwards, which have a negative influence on the product. The application of spray adhesives is likewise time-consuming and susceptible to error, since metering of the adhesive is incumbent upon the person applying it. A uniform layer thickness of the adhesive layer thus cannot be guaranteed. In addition, spray adhesives contain large quantities of in some cases harmful or irritating solvents, such as for example styrene or butanone, which have to be evaporated before adhesion. Since a foreign material is also introduced into the composite via the spray adhesive, the performance of the cured glass fiber-epoxide composite is in addition somewhat poorer than that of the pure epoxide composite without the addition of a spray adhesive. Pressure-sensitive adhesive strips would indeed be simpler to apply, but foreign materials would remain in the composite as for the spray adhesive, and so the performance of the component would likewise become poorer.

Fibrous mats coated with adhesive, so-called "prepregs" ("preimpregnated fibers"), are known from EP 2 229 421 B1 and are used for producing fiber-reinforced epoxides. The core of the invention is that the adhesive is partly crosslinked, with partial esters of an epoxy resin with an unsaturated carboxylic acid being reacted and partly crosslinked. The adhesive can be swollen and/or solubilized in the epoxy resins of the infusion process.

Prepregs, their production and use are described in detail in WO 2013/107829 A1. They are textile fabrics which are impregnated with a reactive resin. To produce storage life and transportability, the reactive resins are usually partly gelled: that is, the curing reaction is initiated and stopped at an early stage (so-called B stage). A clear increase in viscosity of the resin occurs, which renders the impregnated structure manageable. Prepregs of this type have pressure-sensitive adhesive nature and may thus be laminated together at room temperature. Like adhesive strips, they are usually covered with release liners so that they can be stacked or rolled up. The disadvantage of this prior art is that the partly gelled prepregs have to be stored cooled to prevent the curing reaction from continuing.

EP 2 229 421 B1 solves the problem of short storage life of prepregs in the B stage, in that a textile semi-finished product is provided which is treated with a pressure-sensitive adhesive. The latter is partly crosslinked via a free-radical process. The pressure-sensitive adhesive is used for adhesion on a textile carrier. Both the textile fabric and the partly crosslinked polymer remain at the adhered point in the finished component, as a result of which inhomogeneities are generated in the crosslinking density.

WO 2012/026980 A2 describes the use of spray adhesives having pressure-sensitive adhesive nature to influence the flow behavior of the epoxy resin infused in the VARTM. The commercially available adhesive NuTack® E, NuTack® Blu, NidaTack® NT and 3M™ Super 77™ are mentioned as examples. These spray adhesives reduce the interlaminar shear strength of fibrous composites by more than 8%.

WO 1997/003828 A1 describes fiber-reinforced foams. As described therein, the foam may be provided, for example, with a pressure-sensitive adhesive, to fix the fibrous mats. The problem is that the pressure-sensitive adhesive remains in the cured component as an interfering factor, because it negatively influences the strength thereof.

Therefore WO 2013/060588 A1 proposes using thermoplastic adhesives for temporary fixing of fibrous mats that have the same or a chemically similar resin as the resin used for the VARTM process. Unsaturated polyester resins and vinyl ester resins, which are then dissolved in the VARTM by styrene-containing resins, are described as advantageous.

Crosslinkable adhesives based on epoxides are described in WO 2013/060588 A1 as disadvantageous, since they tend to form a sub-structure which act negatively on the properties of the laminate. However, epoxy resins are preferably used in the VARTM for high-grade components.

A central disadvantage in the current state of the art is the inconvenient fixing of the fibrous mats using adhesives at the edge or spray adhesives. Indeed, pressure-sensitive adhesives are generally described for fixing of, for example, foams to fibrous mats in such infusion processes. However, these foreign materials remaining in the material produce losses in performance which cannot be tolerated in demanding industries, such as for example aviation and space travel or production of rotor blades. A liquid adhesive acquires pressure-sensitive adhesive nature if it brings with it a certain cohesion. Increasing cohesion is achieved in the prior art, for example, with textile fabrics and/or by UV-induced pre-crosslinking (EP 2 229 421 B1) or by the use of thermoplastic adhesives (WO 2013/060588 A1) which are adhesive only at elevated temperatures.

SUMMARY OF THE INVENTION

The object of the present invention was therefore to provide a possibility of temporarily fixing fibrous structures in epoxide composite production without relevantly negatively influencing the performance of the cured components, wherein the deviation in the interlaminar apparent shear strength of the resulting final fixing adhesive/temporary fixing adhesive mixture from that of the pure final fixing adhesive is less than 8%, preferably less than 7%, in particular less than 5%. The deviation is particularly preferably less than 3%. Temporary fixing should here be possible simply, have low susceptibility to error and allow the user as great as possible freedom as regards design.

This object is achieved according to the invention in that an adhesive strip is used for temporary fixing, and specifically an adhesive strip of the type mentioned in the introduction, in which the temporary fixing adhesive is a non-crosslinked pressure-sensitive adhesive which is dissolved in the final fixing adhesive in the course of the second final fixing.

DETAILED DESCRIPTION

To be dissolved within the scope of this application means if, according to the method for determining solubility described in the method part, the temporary fixing adhesive is dissolved at least partly in the final fixing adhesive. An adhesive which is only released from the carrier and optically visibly floats around in the final fixing adhesive, has not fulfilled this definition.

Surprisingly, in spite of the disadvantages of epoxide-based adhesives described in the prior art, a non-crosslinked (and hence storable and soluble) pressure-sensitive adhesive could be developed. This is possible in that the second component (the curing agent) is not added to the 2-component epoxide adhesive, that is, the epoxide adhesive is free of curing agent, or by using latent curing agents, such as for example dicyandiamide. If latent curing agents (and accelerators) are used, attention should be paid to the fact that the crosslinking reaction starts only slowly in the VARTM, so as to avoid formation of sub-structures.

Non-crosslinked within the scope of this application relates to chemical crosslinking and is determined via the method for determining the gel value described in the method part. All pressure-sensitive adhesive compositions having gel values less than 20% are non-crosslinked within the scope of this application.

The use of the adhesive strips of the invention makes it possible for the user to apply the adhesive in simple manner in uniform application quantity to the glass-fiber mats to be adhered. Since it is a non-crosslinked pressure-sensitive adhesive, fixing is not time-critical, since curing of the adhesive does not take place. Also in this manner the prerequisite is provided for an adhesive which makes possible problem-free re-positioning of the glass-fiber mats. Since the deviation in the interlaminar apparent shear strength of a component when using the final fixing adhesive/temporary fixing adhesive mixture from that of a component when using the pure final fixing adhesive is only low, losses in performance in the finished composite material are not to be feared. The solution of the invention is in addition economical since by using an adhesive strip, only the required quantity of adhesive is applied, whereas during metering of the spray adhesive, metering may vary greatly if the user does not apply the adhesive very uniformly. In addition, unhealthy or irritating solvents are not required, which is good for the user.

The use of non-crosslinked transfer adhesive strips which are soluble in the final fixing adhesive makes it possible for the user to have the greatest possible design freedom since the ingress of foreign material in the form of carriers, such as for example textile fabrics, is avoided.

Adhesives which permit a permanent connection with the adhesive base even under relatively weak contact pressure and which after use may be released again from the adhesive base essentially without residue here are designated as pressure-sensitive adhesives. Pressure-sensitive adhesives act to be permanently with pressure-sensitive adhesive nature at room temperature, thus having sufficiently low viscosity and high touch adhesiveness so that they wet the surface of the respective adhesive base even on low contact pressure. The bondability of corresponding adhesives is based on their adhesive properties and the re-releasability on their cohesive properties.

The temporary fixing adhesive preferably comprises at least one polymer and at least one reactive resin, and for 100 parts of polymer, the temporary fixing adhesive contains at least 104 parts of the at least one reactive resin, and optionally a tackifying resin.

The use of such a temporary fixing adhesive can ensure that the deviation in the interlaminar apparent shear strength (ILSS) of a component when using the resulting final fixing adhesive/temporary fixing adhesive mixture from that of a component when using the pure final fixing adhesive, deviates only slightly, if at all, since the mixture for the most predominant part indeed has the same properties as the final fixing adhesive in pure form. The ILSS is a measure of the resistance of the material to shear forces which act on the cohesion between the individual material layers.

The at least one polymer of the temporary fixing adhesive is particularly preferably present as a continuous polymer phase.

"Continuous polymer phase" means that the polymer is present as a continuous phase in which the reactive resin is dissolved and/or dispersed. It has been established that pressure-sensitive adhesives having up to 85% of reactive resin proportion can be realized in this manner. The pressure-sensitive adhesive nature is generated in that the polymers form a continuous phase which ensures the cohesion required for the pressure-sensitive adhesive nature, surprisingly in spite of the high epoxide proportions.

The reactive resins are preferably present dissolved at least partly homogenously in the continuous phase. A system with pressure-sensitive adhesive nature is produced in this manner. In a particularly advantageous embodiment, the reactive resin is present dissolved completely homogeneously in the polymer. A tape consisting thereof is dissolved particularly well in the VARTM.

"Dissolved homogeneously" here means that under a scanning electron microscope, different phases between dissolved material and dissolving material cannot be seen.

The temporary fixing adhesive particularly preferably contains for 100 parts of polymer and optionally tackifying resin, at least 120 parts of reactive resin, preferably at least 200 parts of reactive resin, in particular at least 300 parts of reactive resin. "Part" here relates to parts by weight. The wording "for 100 parts of polymer, at least 120 parts of reactive resin" means that for 100 g of polymer, at least 120 g are used. If tackifying resin is also present, the parts of polymer and tackifying resin are combined. Hence, the details, if more than one reactive resin is used, relate to the sum of the parts by weight of the reactive resins, if more than one polymer is used, to the sum of the parts by weight of the polymers used, optionally plus the quantity of tackifying resin or the sum of the parts by weight of the tackifying resins used.

An epoxy resin is preferably used as the reactive resin. Epoxy resins are used in the VARTM.

Firstly, the like (reactive resin) is dissolved in the like more easily; secondly, the influence on the interlaminar shear strength is kept particularly low, since the dissolved epoxides from the temporary fixing adhesive co-crosslink and thus do not constitute an interfering factor. At least one epoxy resin based on bisphenol A, bisphenol S, bisphenol F, an epoxy novolac, an epoxy cresol novolac or an epoxidized nitrile rubber is particularly preferred as the reactive resin.

The final fixing adhesive is particularly preferably synthesized on the basis of at least one epoxy resin, and the temporary fixing adhesive contains the same grade of reactive resin as the reactive resin of the final fixing adhesive.

Also for the final fixing adhesive, at least one epoxy resin based on bisphenol A, bisphenol S, bisphenol F, an epoxy novolac, an epoxy cresol novolac or an epoxidized nitrile rubber is particularly preferred as the reactive resin.

"Based on" or "on the basis of" in the present case means that the properties of the adhesive composition are determined at least largely on the fundamental properties of this component (the so-called "base resin"), where of course it is not ruled out that they are additionally influenced by the use of modifying auxiliaries or additives or of further polymers in the composition. This may mean in particular that the proportion of base resin in the total mass of the adhesive composition is more than 50 wt. %.

The polymer may be one polymer, but may also be a mixture of two or more different polymers. The at least one polymer may be in particular an elastomer or a thermoplastic.

Examples of polymers are elastomers as are used conventionally in the field of pressure-sensitive adhesives, as are described, for example in the "Handbook of Pressure Sensitive Adhesive Technology" by Donatas Satas (Satas & Associates, Warwick 1999).

These are, for example elastomers based on acrylates and/or methacrylates, polyurethanes, natural rubbers, synthetic rubbers, such as butyl rubbers, (iso)butyl rubbers, nitrile rubbers or butadiene rubbers, styrene block copolymers with an elastomer block of unsaturated or partly or completely hydrogenated polydiene blocks (polybutadiene, polyisoprene, poly(iso)butylene, copolymers of the latter, and further elastomer blocks familiar to the skilled person), polyolefins, fluoropolymers and/or silicones.

Particularly preferred within the scope of the invention are rubber or synthetic rubber or blends generated therefrom. If the latter are used as base material for the temporary fixing adhesive, the natural rubber may be selected in principle from all available qualities, such as for example crepe, RSS, ADS, TSR or CV types, depending on required purity and viscosity level, and the synthetic rubber or synthetic rubbers from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) or polyurethanes and/or blends thereof.

Any type of thermoplastics known to the skilled person may also be used as the at least one polymer, as are mentioned, for example in the textbooks "Chemie and Physik der synthetischen Polymere [Chemistry and physics of synthetic polymers]" by J. M. G. Cowie (Vieweg, Braunschweig) and "Makromolekulare Chemie [Macromolecular chemistry]" by B. Tieke (VCH Weinheim, 1997). These are, for example poly(ethylene), poly(propylene), poly(vinyl chloride), poly(styrene), poly(oxymethylene), poly(ethylene oxide), poly(ethylene terephthalate), poly(carbonates), poly (phenylene oxides), poly(urethanes), poly(ureas), acrylonitrile-butadiene-styrene (ABS), poly(amides) (PA), poly(lactate) (PLA), poly(ether ether ketone) (PEEK), poly(sulfone) (PSU), poly(ether sulfone) (PES). Poly(acrylates), poly (methacrylates) and poly(methyl methacrylates) (PMMA) are indeed likewise possible as the polymer, but not preferred within the scope of the present invention.

The choice of polymer component is dependent on the selected epoxide system. If polar epoxides (often produced by reaction of alcohols with epichlorohydrin, such as for example the reaction product of bisphenol A and epichlorohydrin) are used, more polar polymers are preferred in particular. These include both elastomers, such as acrylonitrile-butadiene rubbers, and thermoplastics, such as poly (ethylene oxide), poly(ethylene terephthalate), poly(carbonates), poly(phenylene oxides), poly(urethanes), poly(ureas), poly(amides) (PA), poly(lactate) (PLA), poly(ether ether ketone) (PEEK), poly(sulfone) (PSU), poly(ether sulfone) (PES).

For less polar epoxides, such as for example dicyclopentadiene diepoxide, less polar polymers are preferred. These are, for example poly(styrene), styrene block copolymers with an elastomer block of unsaturated or partly or completely hydrogenated polydiene blocks (polybutadiene, polyisoprene, poly(iso)butylene, copolymers of the latter, and further elastomer blocks familiar to the skilled person) or thermoplastic polyolefins, fluoropolymers and/or silicones.

In order to obtain temporary fixing adhesives having particularly high epoxide contents, all polymers which do not have pressure-sensitive adhesive nature intrinsically and thus do not fulfill the Dahlquist criterion at room temperature are particularly suitable (see J. Adhesion, 1991, volume 34, pages 189-200 or C. A. Dahlquist: Tack, adhesion, fundamentals and practice, McLaren and Sons Ltd., London, 1966). This applies both for the polymer component and the mixture of polymer and tackifying resin, where one such is used. Although thus polymer and optionally tackifying resin per se do not have pressure-sensitive adhesive nature, the resulting temporary fixing adhesive of the adhesive strips of the invention does have pressure-sensitive adhesive nature.

Particularly advantageous polymers are poly(amides), polyurethanes, nitrile-butadiene rubbers, poly(ureas), poly (ether ether ketone) (PEEK), poly(sulfone) (PSU) and poly (ether sulfone) (PES). They facilitate pressure-sensitive adhesives having very high reactive resin proportions, which is particularly advantageous for the finished components, since the proportion of non-crosslinking polymers is particularly low. Nitrile rubbers here are particularly suitable for the present invention.

If polyurethanes are used, they have been shown to be particularly advantageous for good peel adhesion values in the non-cured state if the polyurethane is semi-crystalline and in the DSC measurement has a melt peak or crystallization peak which corresponds to an enthalpy of fusion of at least 5 J/g, preferably of 20 J/g and particularly preferably of 40 J/g.

The polymers of the polymer mixture may be of linear, branched, star-like or grafted structure to give only a few examples, and may be synthesized as a homopolymer, as a random copolymer, as an alternating copolymer or as block copolymers. The designation "random copolymer" embraces within the scope of this invention not only those copolymers in which the comonomers used in the polymerization are incorporated purely randomly, but also those in which gradients in the comonomer composition and/or local concentrations of individual comonomer types occur in the polymer chains. Individual polymer blocks may be synthesized as a copolymer block (random or alternating).

Tackifying resins may be used for the present invention, but a tackifying resin is unnecessary for the temporary fixing adhesives of the present invention. The required pressure-sensitive adhesive nature of the adhesive composition is also achieved without addition of tackifying resin. Since it is desired that the temporary fixing adhesive is chemically as similar as possible to the final fixing adhesive and the latter conventionally contains no tackifying resins, it is preferred if the temporary fixing adhesive contains no tackifying resins.

In principle all reactive constituents forming macromolecules crosslinking in a synthesizing reaction and known to the skilled person in the field of pressure-sensitive adhesives or reactive adhesives may be used as reactive resins, which are also designated as crosslinkable components, as are described, for example in Gerd Habenicht: Kleben—Grundlagen, Technologien, Anwendungen [Adhesion—Principles, technologies, applications], 6$^{th}$ edition, Springer, 2009.

The structure and the chemical nature of the crosslinkable component are not critical as long as the synthesizing reaction may be carried out under conditions, in particular with regard to the temperatures used, type of catalysts used and the like, which do not lead to a considerable spoiling and/or dissociation of the polymer phase, where preferably they can be mixed at least partly with the elastomer phase.

Epoxide-containing materials or epoxy resins which are useful in the compositions of the invention are any organic compounds having at least one oxirane ring which can be polymerized by a ring-opening reaction. Such materials, which are generally designated as epoxides, comprise both monomeric and polymeric epoxides and may be aliphatic, cycloali-phatic or aromatic. These materials generally have on average at least two epoxide groups per molecule, preferably more than two epoxide groups per molecule. The "average" number of epoxide groups per molecule is defined as the number of epoxide groups in the epoxide-containing material divided by the total number of epoxide molecules present. The polymeric epoxides comprise linear polymers having terminal epoxide groups (for example a diglycidyl ether of a polyoxyalkylene glycol), polymers having skeleton oxirane units (for example polybutadiene-polyepoxide) and polymers having epoxide side groups (for example a glycidyl methacrylate polymer or glycidyl methacrylate copolymer). The molecular weight of the epoxide-containing material may vary from 58 to about 100 000 g/mol or more. Mixtures of different epoxide-containing materials may also be used in the hot-melt compositions of the invention. Useful epoxide-containing materials include those which contain cyclohexene oxide groups, such as the epoxycyclohexanecarboxylates which are exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. For a more detailed list of useful epoxides of this type, reference may be made to U.S. Pat. No. 3,117,099.

Further epoxide-containing materials which are particularly useful in the application of this invention comprise glycidyl ether monomers. Examples are the glycidyl ethers of polyhydric phenols which are obtained by reaction of a polyhydric phenol with an excess of chlorohydrin, such as epichlorohydrin (for example the diglycidyl ether of 2,2-bis (2,3-epoxypropoxyphenol)propane). Further examples of epoxides of this type which may be used in the application of this invention are described in U.S. Pat. No. 3,018,262.

There are a large number of commercially available epoxide-containing materials which may be used in this invention. In particular, epoxides which can be obtained easily include octadecylene oxide, epichlorohydrin, styrene oxide, vinylcyclohexene oxide, glycidol, glycidyl methacrylate, diglycidyl ethers of bisphenol A (for example those which can be obtained under the trade names EPON 828, EPON 1004 and EPON 1001F from Shell Chemical Co. and DER-332 and DER-334 from Dow Chemical Co.), diglycidyl ethers of bisphenol F (for example ARALDITE GY281 from Ciba-Geigy), vinylcyclohexene dioxide (for example ERL 4206 from Union Carbide Corporation), 3,4-epoxycyclohexylmethyl 3,4-epoxycyclohexenecarboxylate (for example ERL-4221 from Union Carbide Corporation), 2-(3,4-epoxycyclohexyl-5,5-spino-3,4-epoxy)cyclohexane metadioxane (for example ERL-4234 from Union Carbide Corporation), bis(3,4-epoxycyclohexyl) adipate (for example ERL-4299 from Union Carbide Corporation), dipentene dioxide (for example ERL-4269 from Union Carbide Corporation), epoxidized polybutadiene (for example OXIRON 2001 from FMC Corporation), silicone resin-containing epoxide functionality, epoxysilanes (for example beta(3,4-epoxycyclohexyl)ethyltrimethoxysilane and gamma-glycidoxypropyltri-methoxysilane, commercially available from Union Carbide), flame-retardant epoxy resins (for example DER-542, a brominated bisphenol-like epoxy resin, obtainable from Dow Chemical Co.), 1,4-butanediol diglycidyl ether (for example ARALDITE RD-2 from Ciba-Geigy), hydrogenated epoxy resins based on bisphenol A-epichlorohydrin (for example EPONEX 1510 from Shell Chemical Co.) and polyglycidyl ethers of phenol-formaldehyde-novolac (for example DEN-431 and DEN-438 from Dow Chemical Co.).

The reactive resin of the temporary fixing adhesive preferably has the same epoxide base as the final fixing adhesive. The more similar temporary fixing adhesive and final fixing adhesive are chemically, the lower will be the deviations in the ILSS. "Similar" here means that, for example when using bisphenol A-based epoxides in the final fixing adhesive, reactive resins based on bisphenol A are also used in the temporary fixing adhesive composition. They may be exactly the same or may differ slightly in molecular weight.

The reactive resin of the temporary fixing adhesive is therefore particularly preferably the same as that of the final fixing adhesive.

The temporary fixing adhesive of the adhesive strip of the invention may contain a curing agent or initiator. However, this is not necessary, since the final fixing adhesive contains a curing agent or initiator. However, the temporary fixing adhesive, as mentioned above, is preferably free of curing agent. The temporary fixing adhesive of the adhesive strip of the invention may furthermore also contain an accelerator. As in the case of the curing agent, this is however also only of secondary significance, since the adjustment of the cross-linking reaction of the reactive resin is effected via the final fixing adhesive.

The temporary fixing adhesive may optionally contain further additives, rheology modifiers, foaming agents, fillers or adhesion promoters.

An adhesive strip of the invention is particularly suitable if the peel adhesion of the non-cured adhesive on steel is at least 1 N/cm. With that, good properties regarding the pressure-sensitive adhesive nature are provided.

The general expression "adhesive strip" comprises a carrier material which is provided on one side or both sides with a (pressure-sensitive) adhesive composition. The carrier is preferably made from the same or at least a very similar material as the fibrous fabric of the composite material so that it does not change the properties thereof. In order to minimise unevenness as far as possible, the carrier should have as low as possible a thickness.

However, in particular, the expression "adhesive strip" within the scope of the present invention comprises so-called "transfer adhesive strips", that is, an adhesive strip without a carrier. In a transfer adhesive strip, the adhesive composition is instead applied before application between flexible liners which are provided with a separating layer and/or have anti-adhesive properties. For application, first of all a liner is always removed, the adhesive composition applied and then the second liner is removed. The adhesive composition may thus be used directly for connecting two surfaces. Such carrier-free transfer adhesive strips are particularly preferred according to the invention. Adhesive bonding which is very precise as regards positioning and metering is facilitated using such a carrier-free transfer adhesive strip with pressure-sensitive adhesive nature according to the invention.

Adhesive strips are also possible in which the process is carried out not using two liners but using one single liner treated to be releasing on both sides. The adhesive strip web is then covered on its upper side with the one side of a liner treated to be releasing on both sides, its lower side with the rear side of the liner treated to be releasing on both sides, in particular an adjacent turn on a bale or a roll.

As mentioned above, in the event of use in the production of composite materials, in which the carrier remains in the composite, the carrier should be as similar as possible to the fibrous material used or match the latter. As low as possible carrier thickness is here to be preferred.

The thickness of the pressure-sensitive adhesive, which is present either as a transfer adhesive strip or coated on a flat structure, is preferably between 1 µm and 100 µm, further preferably between 5 µm and 50 µm and particularly preferably between about 10 µm and 30 µm.

For application in the production of rotor blades, the preferred layer thickness is from 10 µm to 30 µm. The layer thickness should be selected all the lower, the fewer the epoxides that are present in the temporary fixing adhesive, since a lower epoxide proportion in the adhesive has a greater negative effect on the ILSS. If the temporary fixing adhesive on the other hand has a higher epoxide content, only a low or virtually no negative influence on the ILSS is produced and it is possible to also use a greater layer thickness of the temporary fixing adhesive.

In addition, the invention relates to the use of the adhesive strip of the invention for temporary fixing of fibrous structures in composite production. Typical areas of application are the automobile industry, aircraft construction and boat-building and rotors for wind power plants. In particular for rotors for wind power plants, fibrous mats of very large dimensions are to be fixed temporarily in a mold, which causes great difficulties, since faults and unevenness occur easily. Temporary fixing is facilitated in simple and cost-effective manner by the adhesive strip of the invention without this temporary fixing bringing with it considerable losses in the quality of the finished product.

The adhesive strip of the invention is particularly preferably used for temporary fixing of fibrous structures in vacuum resin infusion processes, wherein the resin for the vacuum resin infusion process is selected from the group of epoxy resins. Epoxy resins are particularly advantageous for vacuum resin infusion processes, because the finished components have particularly good properties with regard to the ILSS when using epoxy resins.

Finally, the present invention relates to a method for producing a composite from fibrous structures and a final fixing adhesive, comprising the steps of temporarily fixing the fibrous structures in a mold and to one another using the adhesive strip of the invention containing a temporary fixing adhesive;

adding the final fixing adhesive while dissolving the temporary fixing adhesive of the adhesive strip in the final fixing adhesive; and curing the final fixing adhesive.

Adding the final fixing adhesive is preferably effected by a resin infusion process which is also called vacuum infusion process. Glass-fiber mats are here laid out over a large area in the required shape and then epoxy resins are drawn in under vacuum.

Temporary fixing using the adhesive strip of the invention facilitates very simple, precise fixing, which can be corrected in the interim, of the glass-fiber mats firstly to the mold, secondly of the glass-fiber mats to one another. Temporary fixing by means of adhesive strip has numerous advantages with respect to traditional fixing using a spray adhesive. Hence, there are no solvents which must or may evaporate, which would lead to health impairments for the user. Metering is simplified, since a fixed quantity is always applied and it does not depend on the skill and the accuracy of the user which quantity of adhesive is applied in which area. Furthermore, no drying time is required, since no solvent has to evaporate, which leads to a considerable gain in time in the production.

EXAMPLES

Measuring Methods

Gel Value Determination

Adhesive strip samples in pieces of 20 cm$^2$ were for this purpose punched out and sealed in a bag made from polyethylene spun-bonded fabric (Tyvek from Du Pont having a weight per unit area of about 55 g/cm$^2$). The specimens were extracted using butanone for 3 days with shaking at room temperature. The butanone was changed daily. After completing extraction, the samples were dried at 110° C. The gel proportion was determined by differential weighings, wherein the extraction losses of the spun-bonded fabric and of the carrier were taken into account. The gel value is determined as a percentage detail of the weight proportion of the polymer which cannot be extracted using butanone, from the difference in sample weights before extraction and after extraction.

Solubility of Pressure-sensitive Adhesive Compositions in Final Fixing Adhesives Epon Resin 828 from Momentive (bisphenol A-epichlorohydrin reaction product) was selected as the final fixing adhesive.

Epon Resin 828 was heated to 40° C.±1° C. in a 250 mL glass vessel with stirring using a magnetic stirrer. For the test, the pressure-sensitive adhesive composition to be tested was laminated onto etched PET and dissolved for 24 hours in the stirred Epon Resin 828. The assessment was effected optically according to the following criteria:

is dissolved: adhesive strip residues are no longer present on the PET partly dissolved: parts of the PET carrier are no longer covered with adhesive composition swells: the layer thickness of the adhesive strip has increased, but the PET carrier is still completely covered with adhesive composition is not dissolved: the PET carrier is still completely covered with adhesive composition Molecular Weight:

The molecular weight determinations of the number-average molecular weights Mn and the weight-average molecular weights $M_W$ were effected by means of gel-permeation chromatography (GPC). THF (tetrahydrofuran) with 0.1 volume % of trifluoroacetic acid was used as eluent. Measurement was effected at 25° C. PSS-SDV, 5 µl., $10^3$ Å, ID 8.0 mm×50 mm was used as a precolumn. For separation, the columns PSS-SDV, 5 µ, $10^3$ as well as $10^5$ and $10^6$ with in each case ID 8.0 mm×300 mm were used. The sample concentration was 4 g/l, the flow rate 1.0 ml per minute. Measurement was made against polystyrene standards.

Interlaminar apparent shear strength (ILSS):

To test the samples, the 100 kN servohydraulic testing system from Inova was used and for data recording, an MGC Plus from HBM (Hottinger Baldwin Messtechnik). The measuring rate was 20 Hz.

For the tests, the test apparatus according to EN ISO 14130 was used (FIG. 3). Using this test structure, the interlaminar apparent shear strength is determined. The structure is similar in principle to that of the three-point bending test. However, very small samples are used to cause interlaminar failure.

Raw Materials Used:

| | |
|---|---|
| Breon N41H80 | Nitrile-butadiene rubber having an acrylonitrile proportion of 41% from Zeon Chemicals (London, UK) |
| Desmomelt 530 | Largely linear hydroxylpolyurethane. Desmomelt 530 is a strongly crystallising, elastic polyurethane of very low thermoplasticity from Bayer Material Science |
| Epon Resin 828 | Difunctional bisphenol A/epichlorohydrin liquid epoxide having a weight per epoxide of 185-192 g/eq from Momentive. |
| PolyDis PD3611 | Nitrile rubber-modified epoxy resin based on bisphenol F diglycidyl ether having an elastomer content of 40% and a weight per epoxide of 550 g/eq from Schill + Seilacher "Struktol". |
| PolyDis PD3691 | Nitrile rubber-modified epoxy resin based on bisphenol A diglycidyl ether having and elastomer content of 5% and a weight per epoxide of 205 g/eq from Schill + Seilacher "Struktol". |
| Butanone | Solvent |

| | Example: | | | | | |
|---|---|---|---|---|---|---|
| | K1 Parts by weight | K2 Parts by weight | K3 Parts by weight | K4 Parts by weight | K5 Parts by weight | V1 Parts by weight |
| Breon N41H80 | 20 | 20 | — | — | 50 | 65 |
| Desmomelt 530 | — | — | 20 | 30 | — | — |
| Epon Resin 828 | 80 | — | 80 | 70 | 50 | 30 |
| PolyDis PD3611 | — | 65 | — | — | — | — |
| PolyDis PD3691 | — | 15 | — | — | — | 5 |

The corresponding raw materials were dissolved in butanone, and/or Breon was pre-dissolved in the mixer using solvent. The solids content was between 40% and 50%. Laboratory smears were produced on siliconized PET and the solvent was allowed to evaporate.

The fixing agents having pressure-sensitive adhesive nature were compared to a reference (without fixing agent) and 2 competitor products (spray adhesive Aerofix 2 and 3M 11095). The samples have four glass-fiber layers and fixing agent was applied between each layer. The quantity of spray adhesive was 10 to 15 g/m². The tapes having pressure-sensitive adhesive nature were between 20 µm and 30 µm thick.

The sample plates were produced with the aid of VARTM (vacuum-assisted resin transfer molding). An 812 g/m² biaxial fabric (batch number 1012299) from Saertex was used. The plates were laminated using the epoxide system RIM 135 from Momentive (batch number SG1CO197) and the curing agent RIM137 (batch number SG1BO364) at 40° C. and under an absolute pressure of 2 mbar. Then the samples were cut to size and tempered in a tempering oven for 10 hours at a temperature of 70 C.

Results of Dissolving Test:

| | K1 | K2 | K3 | K4 | K5 | V1 |
|---|---|---|---|---|---|---|
| is dissolved | x | x | x | x | x | |
| partly dissolved | | | | | | x |
| swells | | | | | | |
| undissolved | | | | | | |

*in none of the cases was an undissolved residue found in the epoxide extraction agent which would be attributable to release of a crosslinked composition Gel values

| | K1 | K2 | K3 | K4 | K5 | V1 |
|---|---|---|---|---|---|---|
| Gel value | 1% | 0% | 0% | 1% | 0% | 2% |

Sample Geometry and Testing

For ILSS testing according to EN ISO 14310, the samples and the geometry thereof are dependent on the laminate thickness. A sample body has ten times the thickness than length and five times the thickness than width. The distance of the support (pressure fins) likewise corresponds to five times the thickness. According to test standard EN ISO 14130, it must be pointed out that the test result ascertained is not an absolute value. Therefore the designation "apparent interlaminar shear strength" is used to define the measured parameters.

Measured Values:

| | Example: | | | | | | | | |
|---|---|---|---|---|---|---|---|---|---|
| | K1 | K2 | K3 | K4 | K5 | V1 | SK1 | SK2 | R |
| ILSS/MPa | 29.63 | 29.82 | 28.67 | 28.29 | 28.34 | 26.51 | 21.32 | 27.05 | 29.75 |
| delta (ILSS)/% | −0.4 | +0.2 | −3.6 | −4.9 | −4.7 | −10.9 | −28.3 | −9.1 | | delta (ILSS): percentage change in ILSS compared to the reference in which the fibrous mats have been fixed without adhesive.
R: Reference component without using fixing adhesives.
Commercial spray adhesives SK1 (Aerofix 2 from Cytec) SK2 (Adjustable Composite Positioning System 11095 from 3M)

It is found that the temporary fixing adhesives K1 to K5 of the invention have significantly lower deviations in ILSS with respect to the comparative example. The deviation here is all the lower, the higher the epoxide proportion (see K1 in contrast to K5, K3 with respect to K4). Furthermore, it is found that the use of nitrile rubber as a polymer component delivers better results than the use of polyurethanes (see K1 with respect to K3). The deviations with respect to the reference spray adhesives of the prior art (SK1 and SK2) are considerable.

The invention claimed is:

1. A method for producing a composite from fibrous structures and an adhesive strip containing a final fixing adhesive, comprising the steps of
    selecting an adhesive strip comprising a temporary fixing adhesive for a first temporary fixing of two substrates to one another as a first stage to a second final fixing of the two substrates, wherein the second final fixing is effected by a final fixing adhesive and this final fixing adhesive absorbs the temporary fixing adhesive in the course of the second final fixing, wherein the temporary fixing adhesive is a non-crosslinked pressure-sensitive adhesive and wherein it is dissolved in the final fixing adhesive in the course of the second final fixing;
    temporarily fixing the fibrous structures in a mold and to one another using the adhesive strip;
    adding the final fixing adhesive while dissolving the temporary fixing adhesive in the final fixing adhesive; and
    curing the final fixing adhesive.

2. The method according to claim 1, wherein adding the final fixing adhesive is effected by a resin infusion process.

3. The method according to claim 1, wherein the temporary fixing adhesive comprises:
    at least one polymer
    optionally a tackifying resin
    at least one reactive resin, wherein the temporary fixing adhesive comprises 100 parts of polymer and tackifying resin and at least 104 parts of the at least one reactive resin.

4. The method according to claim 3, wherein the at least one polymer is present in the temporary fixing adhesive as a continuous polymer phase.

5. The method according to claim 3, wherein at least one epoxy resin is present in the temporary fixing adhesive as the reactive resin.

6. The method according to claim 5, wherein the final fixing adhesive is synthesized on the basis of at least one epoxy resin and the temporary fixing adhesive comprises the same grade of reactive resin as the reactive resin of the final fixing adhesive.

7. The method according to claim 5, wherein at least one epoxy resin based on bisphenol A, bisphenol S, bisphenol F, an epoxy novolac, an epoxy cresol novolac, or an epoxidized nitrile rubber is present as the reactive resin.

8. The method according to claim 3, wherein the at least one polymer is an elastomer or a thermoplastic.

9. The method according to claim 3, wherein the at least one reactive resin is present dissolved at least partly, homogeneously in the continuous polymer phase.

10. The method according to claim 3, wherein at least one polymer is selected from the group consisting of polyurethanes, nitrile-butadiene rubbers, polyamides, poly(ether ether ketone) (PEEK), poly(sulfone) (PSU), and poly(ether sulfone) (PES).

11. The method according to claim 1, wherein the adhesive strip is present without a carrier as a transfer adhesive strip.

* * * * *